United States Patent [19]

Chu

[11] 4,439,466

[45] Mar. 27, 1984

[54] RANEY NICKEL ELECTRODE FOR NI-H₂ CELL

[75] Inventor: Alan K. P. Chu, Granada Hills, Calif.

[73] Assignee: Atlantic Richfield Company, Los Angeles, Calif.

[21] Appl. No.: 481,440

[22] Filed: Apr. 1, 1983

[51] Int. Cl.³ .......................... B05D 1/08; B05D 5/12
[52] U.S. Cl. ..................................... 427/123; 429/44; 429/223; 204/290 R; 427/352; 427/423; 502/101
[58] Field of Search ................ 427/78, 123, 352, 423; 429/44, 223; 204/290 R, 292; 252/425.3

[56] References Cited

U.S. PATENT DOCUMENTS 3,291,642 12/1966 Jung ........................................ 429/45
3,403,057 9/1968 Stankavich ............................. 429/45
4,024,044 5/1977 Brannan ................................. 429/44
4,177,157 12/1979 Adams .................................. 429/223

Primary Examiner—John F. Niebling
Attorney, Agent, or Firm—Roderick W. MacDonald

[57] ABSTRACT

A method for making a Raney nickel electrode without employing a pressure compacting step comprising providing a substrate, coating the substrate with a Raney nickel-aluminum alloy using a plasma deposition technique, and thereafter leaching at least part of the aluminum out of the Raney alloy coating to provide a porous electrode body.

9 Claims, 2 Drawing Figures

RANEY NICKEL ELECTRODE FOR NI-H$_2$ CELL

BACKGROUND OF THE INVENTION

Rechargeable batteries have been developed which have excellent elecrochemical characteristics but which are relatively expensive. One example of such a battery is the nickel/hydrogen battery which employs a nickelic hydroxide electrode as the positive electrode and a catalytic platinum hydrogen electrode as the negative electrode. The platinum electrode is costly but can be replaced with a Raney nickel electrode.

In the formation of Raney nickel electrodes for batteries, often a high pressure compacting step is employed because the starting metal for the electrode is in powder form. For example, see U.S. Pat. No. 3,291,642 which employs a pressure compacting step requiring of from two to ten tons per square centimeter. Even when a high temperature flame spraying technique is used in applying the metal powder to the electrode body, a high pressure compacting step for at least part of the electrode body is still employed. For example, see U.S. Pat. No. 3,403,057 wherein a pressure of approximately five tons per square inch is employed on a significant portion of the electrode body.

SUMMARY OF THE INVENTION

According to this invention, there is provided a method for making a Raney nickel electrode body without utilizing even a partial high pressure compacting step which process employs a technique of coating a substrate with a Raney alloy using a plasma deposition technique.

Thus, by this invention, the expense of high pressure compacting while forming an electrode body is eliminated.

DETAILED DESCRIPTION OF THE INVENTION

Figure 1:
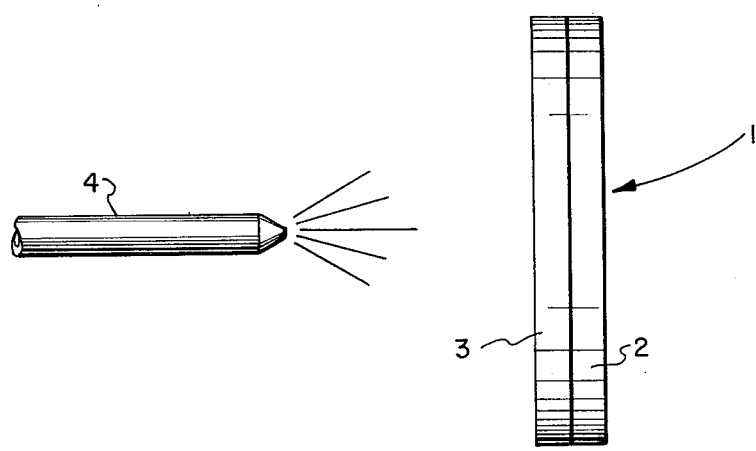
FIG. 1 shows a side view of an electrode body when being formed in accordance with the method of this invention.

More specifically, FIG. 1 shows an electrode body which is composed of a substrate 1 with an electrode metal coating 2 thereon, the electrode coating 2 being deposited on substrate 1 by plasma deposition apparatus 3.

Figure 2:
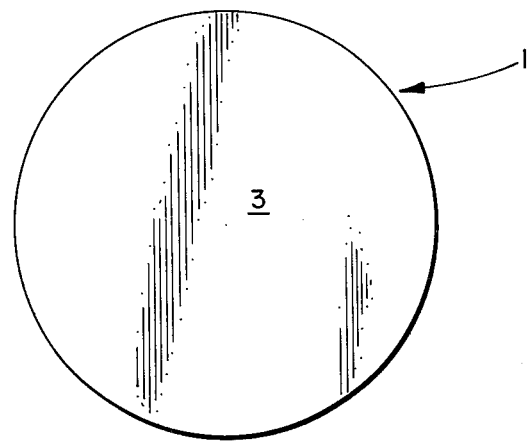
FIG. 2 is a front view of the electrode body of FIG. 1.

FIG. 2 shows a front elevation of substrate 1 and metal coating 2 and further shows the electrode body to be of a generally circular configuration. This invention is not limited to circular configurations for the electrode bodies formed in accordance with the process of this invention.

In accordance with the method of this invention, a substrate is provided, for example, a graphite or carbon body of any desired shape, configuration, and thickness, all of which will vary considerably depending on the particular type of galvanic cell or battery in which the electrode body is to be employed, but all of which are within the skill of the art to determine.

The substrate is then coated on one or more surfaces thereof with a Raney nickel-aluminum alloy using plasma deposition techniques. The plasma deposition apparatus is known in the art and, therefore, need not be further described in detail. The plasma deposition technique employed in this invention preferably employs the Raney alloy subdivided in a 200–300 mesh (U.S. Standard size) sieve range. The metal powder is subjected to a plasma deposition step at a temperature in the range of from about 2600° to about 2800° C. using a metal feed rate to the plasma jet of from about $8^8$ to about $12^8$ centimeters per second for a time sufficient to deposit a Raney alloy coating on the substrate of from about 1 to about 10 mils.

The substrate with its Raney alloy coating can then be subjected to leaching to dissolve at least part of the aluminum out of the Raney alloy coating and to provide a porous electrode body for use in a galvanic cell, and the like.

If desired, after the plasma deposition step and before the leaching step, the substrate with its Raney alloy coating can be subjected to an intermediate coating step wherein a hydrophobic material is uniformly deposited over the electrode body. The hydrophobic material is preferably a polymeric material such as polytetrafluoroethylene. The hydrophobic material coating can vary from about 1 to about 2 mils as desired so long as the thickness doesn't hinder the subsequent leaching step for removal of at least part of the aluminum from the electrode body.

After the leaching step, the electrode body can then be washed in distilled water and stored under water or a dilute basic solution such as aqueous potassium hydroxide until used in the construction of the galvanic cell.

The Raney alloy employed in the method of this invention preferably contains from about 40 to about 60 weight percent, based on the total weight of the alloy, of nickel with the remainder being essentially aluminum. Often, the Raney alloy will contain approximately equal amounts by weight of nickel and aluminum.

The leaching step can be carried out using any basic solution which will remove the aluminum but not the nickel from the electrode body and is preferably an aqueous solution of an alkali metal hydroxide such as potassium hydroxide.

EXAMPLE

A Raney alloy containing approximately 50 percent nickel and 50 percent, by weight, aluminum is subdivided so that the preponderance of the particles pass through a 200 mesh sieve and are retained on a 300 mesh sieve. The particles are then fed at a rate of $10^8$ centimeters per second to a plasma coating machine operating at a plasma temperature of about 2600° to 2800° C. The plasma is directed at a 6½ inch diameter round piece of stackpole carbon paper until about a 10 mil thickness metal coating is deposited on one side of the substrate to yield an electrode body of the configuration shown in FIGS. 1 and 2, element 1 in FIG. 1 being the stackpole carbon paper substrate and element 2 being the Raney alloy coating thereon.

The thus formed electrode body is then coated on all sides and edges with polytetrafluoroethylene by pulling liquid polytetrafluoroethylene around and through the pores of the electrode body to provide a 1 mil thickness of polytetrafluoroethylene coating uniformly over the electrode body.

The resulting electrode body is then submerged in 6 Normal potassium hydroxide solution at ambient temperature and pressure for a time sufficient to dissolve a majority of the aluminum out of member 2. The resulting porous electrode body is then ready for use in a galvanic cell after washing of same with distilled water to remove remaining traces of leaching solution.

The resulting electrode body is useful in a galvanic cell or the like even though no high pressure compacting step has been applied to same.

Reasonable variations and modifications are possible within the scope of this disclosure without departing from the spirit and scope of this invention.

The embodiments of the invention in which an exclusive property or privilege is claimed are defined as follows:

1. A method for making a Raney nickel electrode body without a pressure compacting step comprising providing a substrate, coating said substrate with a Raney nickel-aluminum alloy by plasma deposition, coating said body with a hydrophobic material, and leaching said coated body to remove at least part of the aluminum out of said Raney alloy coating and provide a coated porous electrode body.

2. The method according to claim 1 wherein said hydrophobic material is polymeric.

3. The method according to claim 2 wherein said hydrophobic material is polytetrafluoroethylene.

4. The method according to claim 1 wherein said Raney alloy contains from about 40 to about 60 weight percent nickel, the remainder being essentially aluminum.

5. The method according to claim 1 wherein said substrate is a graphitized paper.

6. The method according to claim 1 wherein said leaching step is carried out by subjecting said electrode body to an aqueous solution of an alkali metal hydroxide.

7. The method according to claim 1 wherein said Raney alloy is subdivided to be substantially in the 200 to 300 mesh range and then subjected to said plasma deposition step at a temperature in the range of from about 2600° to about 2800° C.

8. The method according to claim 7 wherein said subdivided Raney alloy is fed to said plasma at a rate of from about $8^8$ to about $12^8$ centimeters per second for a time sufficient to deposit a Raney alloy coating on said substrate of from about 1 to about 10 mils.

9. The method according to claim 3 wherein said substrate is graphitized paper, said Raney alloy contains approximately equal amounts of nickel and aluminum and is subdivided to be substantially in the 200 to 300 mesh range, the plasma deposition step is carried out at a temperature in the range of from about 2600° to about 2800° C., and the leaching step is carried out using an aqueous solution of potassium hydroxide.

* * * * *